July 14, 1959  J. G. MILLER  2,894,285
GOB FEEDING OF ORGANIC PLASTIC MATERIALS
Filed Oct. 12, 1954  5 Sheets-Sheet 1
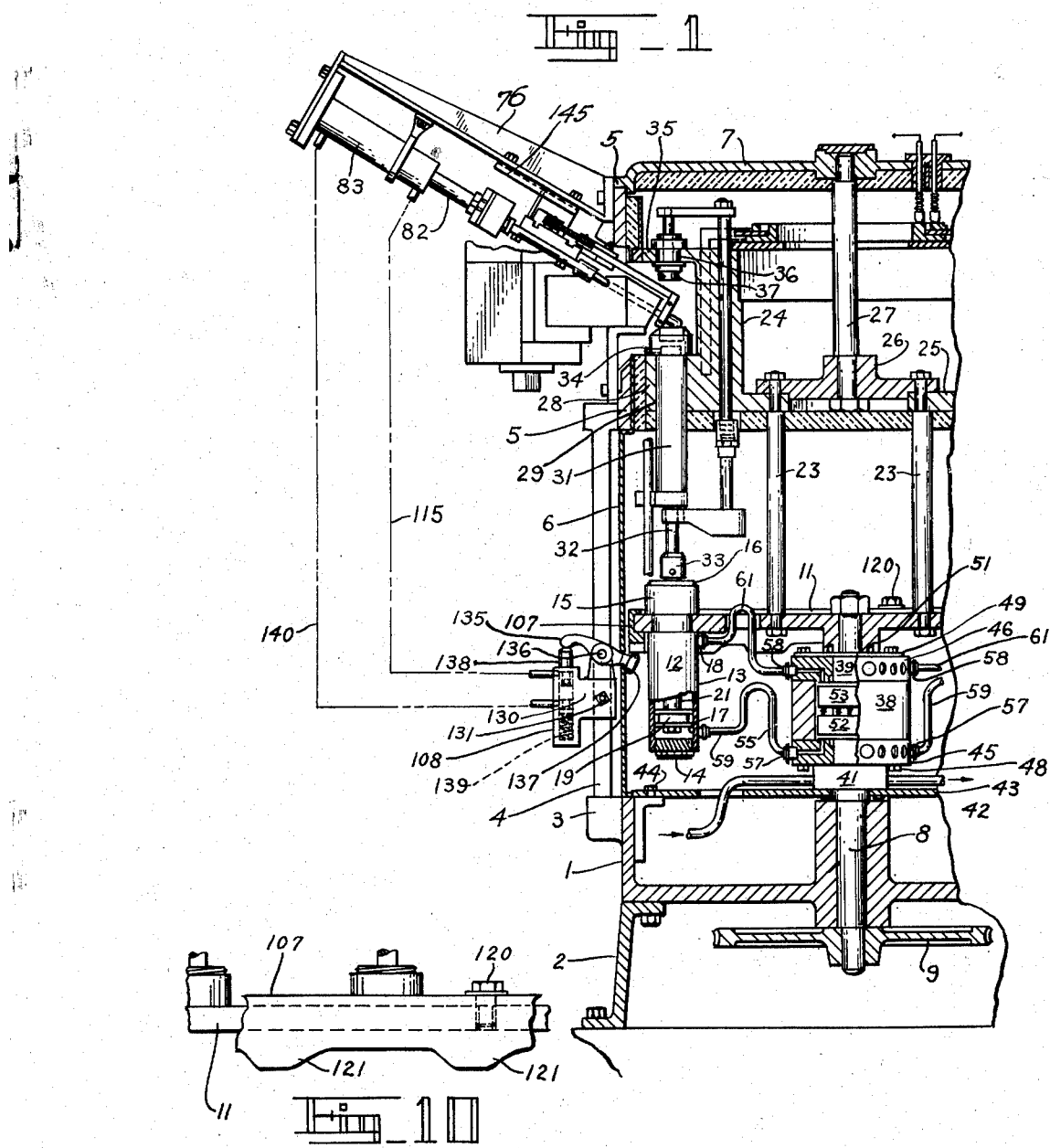
INVENTOR.
JOHN G. MILLER

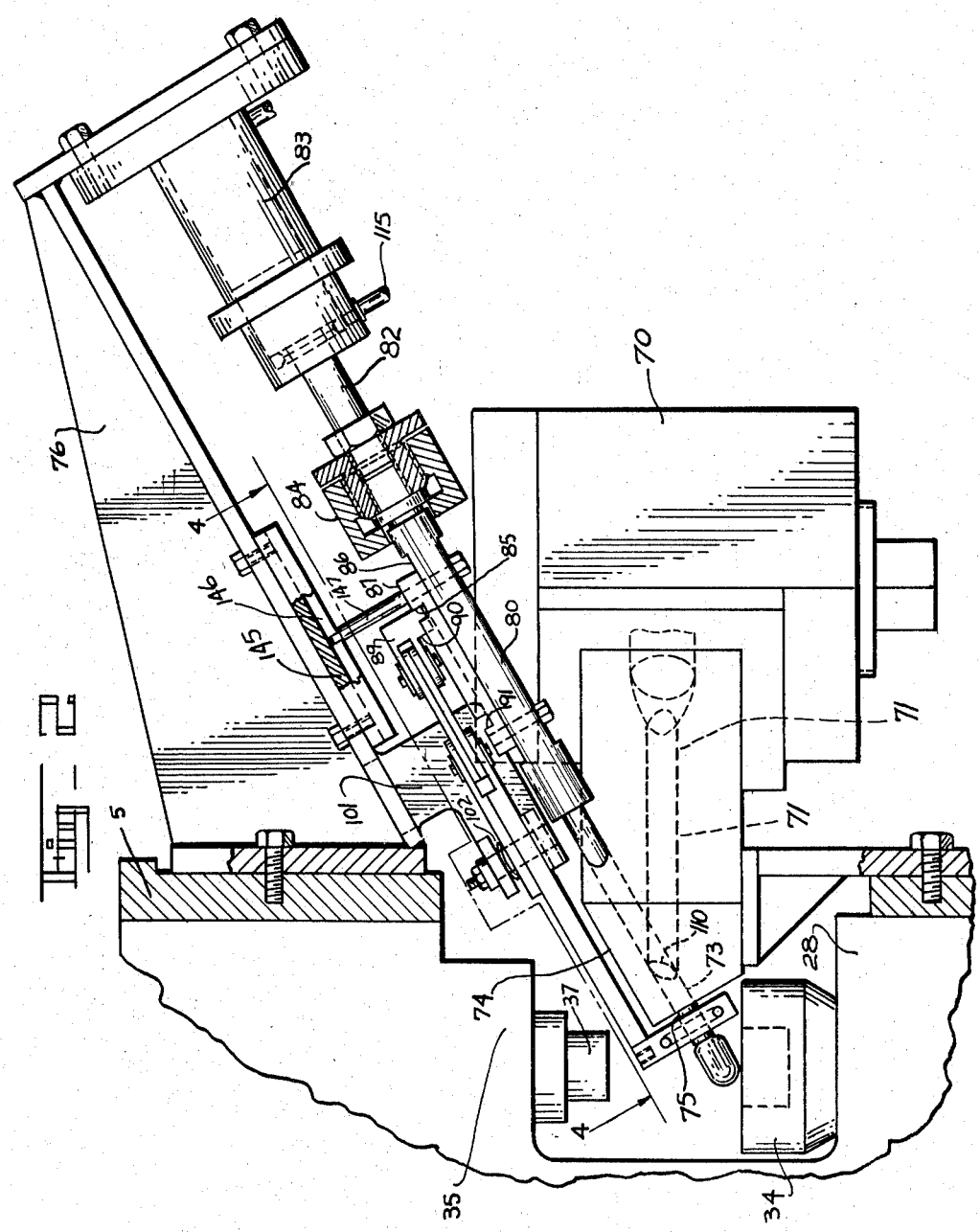

July 14, 1959 J. G. MILLER 2,894,285
GOB FEEDING OF ORGANIC PLASTIC MATERIALS
Filed Oct. 12, 1954 5 Sheets-Sheet 3
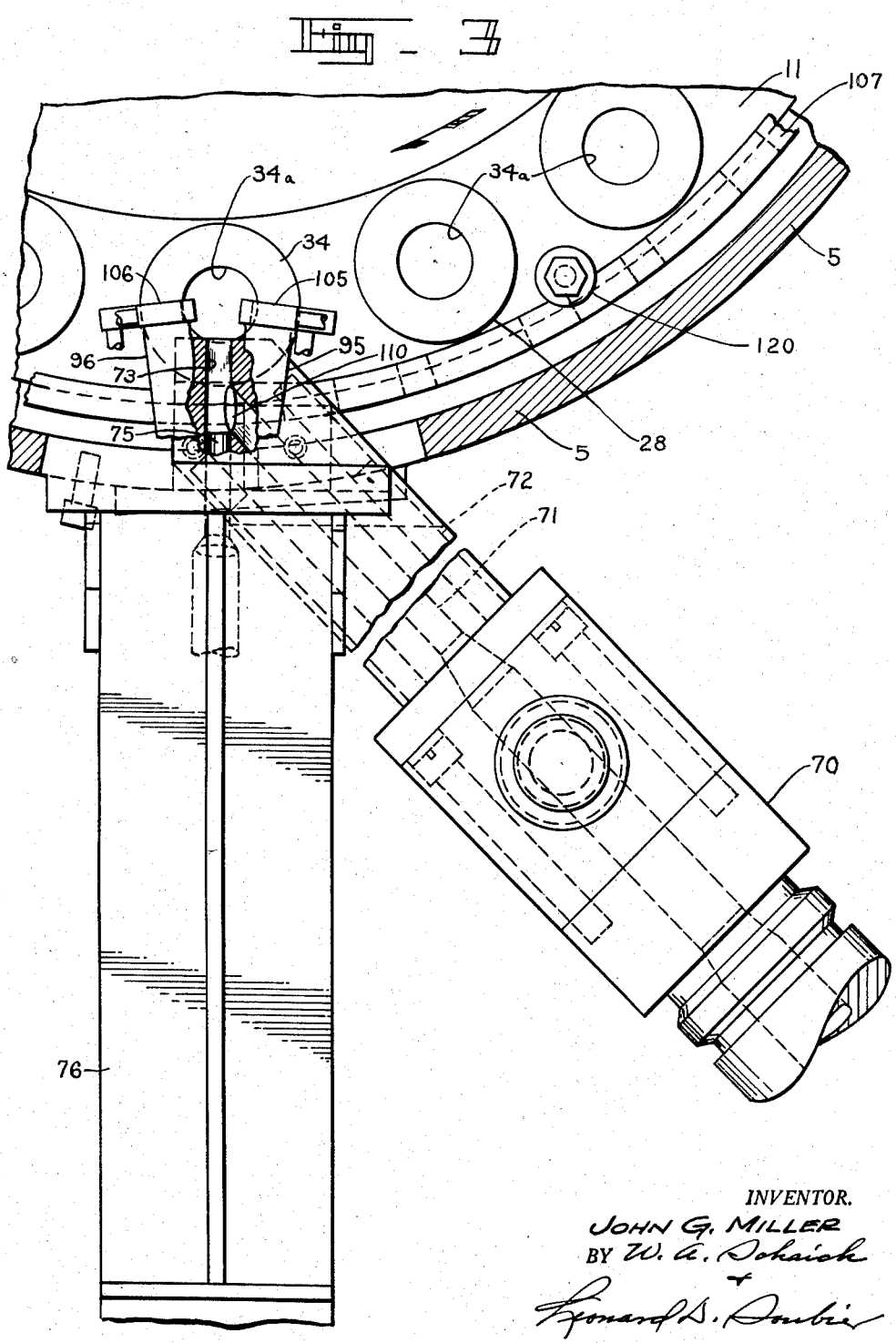
INVENTOR.
JOHN G. MILLER

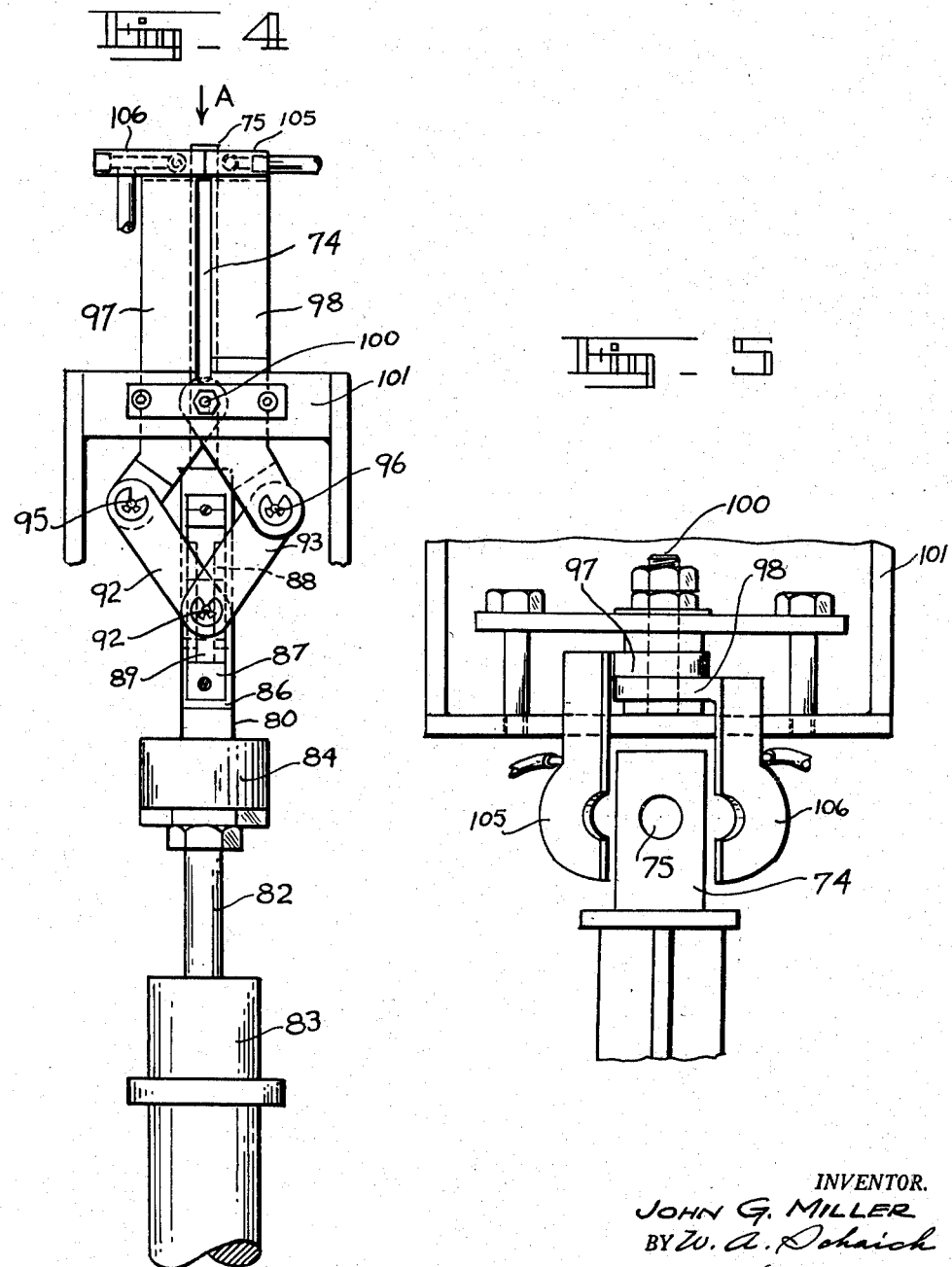

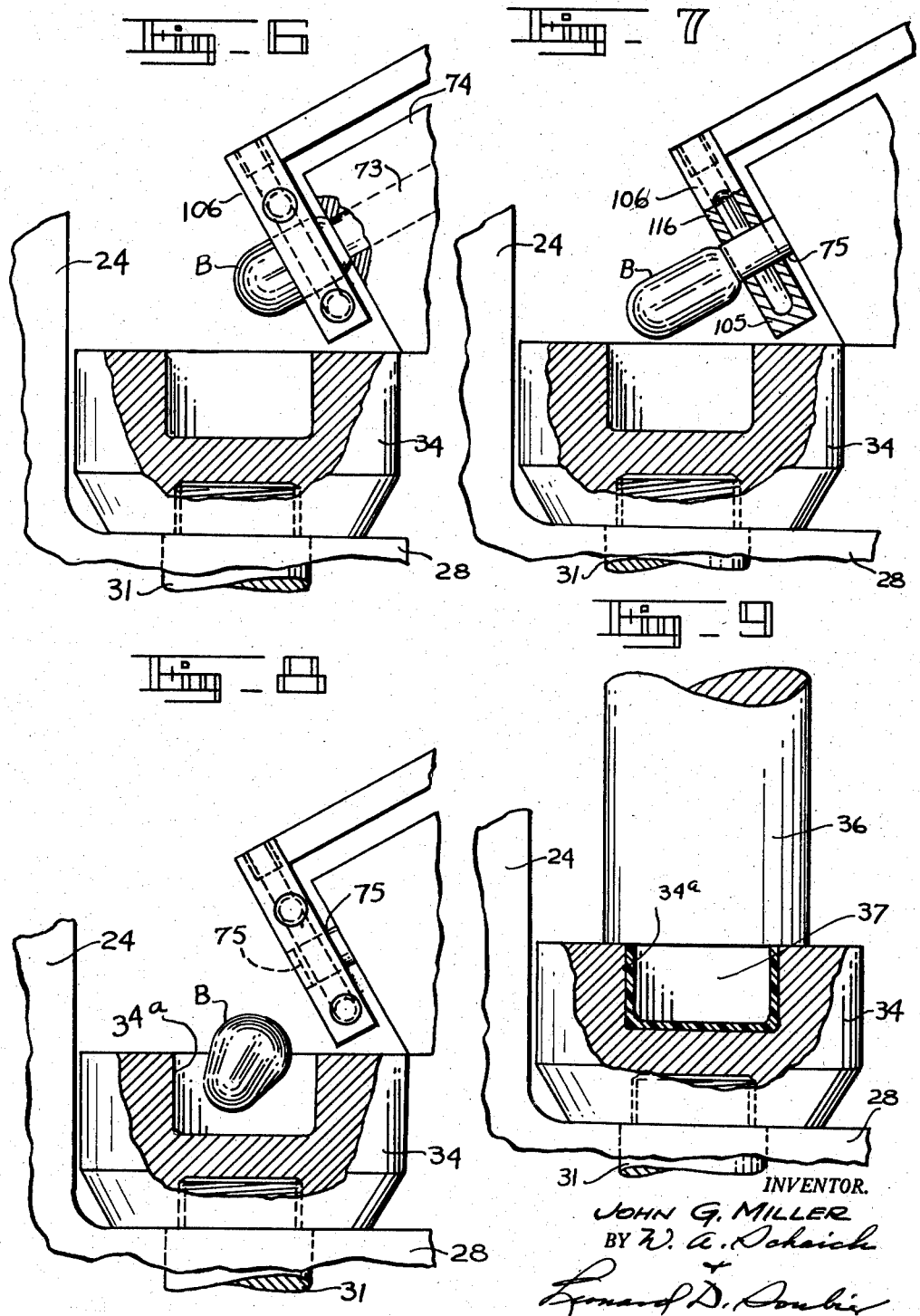

ated July 14, 1959

2,894,285
GOB FEEDING OF ORGANIC PLASTIC MATERIALS

John G. Miller, Toledo, Ohio, assignor to Owens-Illinois Glass Company, a corporation of Ohio Application October 12, 1954, Serial No. 461,710

4 Claims. (Cl. 18—30)

My invention relates to a method and apparatus for feeding measured charges of workable organic plastic material in a heated condition, directly into the molds of a forming machine. In the field of molding thermosetting organic plastic materials it is well known to feed measured charges of powdered material either in powder form or in pellet form into a heated forming mold and then to simultaneously subject such material to temperatures and pressures capable of converting the material to a moldable condition and thence into a shaped product.

However, in the field of organic thermo-plastic materials the procedure has been entirely confined either to the injection molding of articles under pressure or the extrusion of hollow blanks in moldable condition and the subsequent expansion of such blanks under fluid pressure to the confines of a forming mold.

It is the prime object of this invention to provide a means whereby measured charges of thermo-plastic material may be segregated from a parent body of such material and deposited directly into a mold where it may be shaped to final form by the application of pressure.

Such materials as polyethylene and polystyrene are among those which may be utilized to carry out this method as well as many other thermoplastic materials, as for example those found in the market under the trademarks or trade names of Saran or Kel-F. Many of these materials have a temperature degradation point ranging upwardly to approximately 500 to 600° F. and it is contemplated that the materials used in connection with this present invention may be worked within this temperature range.

A further object is to provide a parent body of any one of these materials at a desired working temperature and to segregate measured charges thereof from the parent body in continuous successive individual charges.

It is the further object to provide a means whereby these various materials as they are segregated into mold charges may be freely dropped or deposited directly into the forming mold without having any intermediate contact with any member or device which would upset the balance of temperature conditions obtaining in the charge of plastic, moldable material.

Other objects will be apparent in the following specification.

In the drawings,

Fig. 1 is a part sectional elevation showing my device adapted to the well known Lauterbach molding machine, such as shown in Patent 2,198,543, Fig. 2 is an enlarged elevational view of the gob feeding device showing its relationship to the forming mold and the pressing plunger of the Lauterbach machine, Fig. 3 is a plan view of the gob feeding device, Fig. 4 is a plan view of the gob feeding device showing in particular the gob stripping mechanism, Fig. 5 is a view of the gob stripping mechanism taken in the direction of arrow A on Fig. 4, Fig. 6 is an enlarged view showing a gob of plastic material issuing from the container, Fig. 7 shows the gob segregated from the parent body and pushed over the forming mold, Fig. 8 shows the gob stripped from the feeding plunger and being deposited in the mold, Fig. 9 shows the gob formed into a hollow molded article, and Fig. 10 is a partial view of the valve control cam for the gob feeder.

With reference to Fig. 1 of the drawings, the embodiment of the molding machine therein illustrated comprises a base member 1 supported upon legs 2. The base member 1 has at its periphery bosses 3 in which are secured vertical tie rods 4 which constitute a support for an upper housing 5. Between the base 1 and the housing 5 is a casing 6 which partially embraces the intervening space and which with the housing 5 forms a chamber for the moving parts of the mechanism. As illustrated, the housing 5 comprises a cover plate 7.

Journaled in the central part of the base 1 is a vertical shaft 8 which carries at its lower end a worm wheel 9. To the upper end of this shaft is secured a flange 11 which carries on the peripheral portion thereof an annular series of hydraulic cylinders 12. As shown in Fig. 1, each of these cylinders comprises a main cylindrical section 13 which is closed at the bottom by a threaded plug 14 and which is supported in the flange 11 by means of a threaded sleeve 15, this sleeve also receiving a threaded plug 16 which closes the upper end of the cylinder. Each of these cylinders is provided at the lower end with a port 17 and toward the upper end with a port 18, for admission and discharge of an actuating fluid respectively. In each of the cylinders is a hydraulic piston 19 having a piston rod 21 which extends upwardly through the plug 16.

Supported on the flange 11 by means of tie rods 23 is a rotary head or drum 24, said head having at its lower end an inwardly projecting flange 25 through which the said tie rods extend. The flange 25 constitutes a support for a member 26 which is secured to the flange 25 by the tie rods 23 and which constitutes a support for a shaft section 27 which extends upwardly through the head 24 and is journaled at its upper end in anti-friction bearings in the cover plate 7 of the housing 5. The head 24 also comprises a radial flange 28 having a series of vertical bores 29 corresponding in number and in vertical alignment with the cylinders 12, and in each of these bores is slidably supported a cylindrical member 31 having at its lower end an extension 32 of reduced diameter which is joined by means of a suitable sleeve coupling 33 with the piston rod 21 of the aligned hydraulic cylinder 12. Detachably mounted at the upper end of each of the members 31 is a die element 34. The head 24 also has at its upper end an outwardly projecting radial flange 35 having a circumferential series of cylindrical openings 36 aligned respectively with the bores 29 of the underlying flange 28, and each of the openings 36 carries a die element 37 designed to cooperate with the aligned die element 34 supported as previously described upon the members 31.

Embracing the shaft 8 immediately below the flange 11 is a master valve unit designated generally by the reference numeral 38. As shown in Fig. 1, this valve unit comprises a central sleeve 39 which embraces the shaft 8 and which through its lower enlarged portion 41 is secured by means of stud bolts 42 to a plate 43, this plate in turn being secured by bolts 44 to the base 1. Embracing the sleeve 39 is a housing consisting of a lower section 45, which is supported upon the lower extended end 41 of the sleeve and which closely embraces the latter, a corresponding upper section 46, and an intermediate section 47, these three sections being secured together by bolts 48. Secured against the upper surface of the upper section 46 of this housing is a plate 49 having upwardly projecting pins 51, which pins as shown in Fig. 1 enter recesses in the sub-portion of the flange 11 and thereby immobilize the housing 45—46—47 with respect to this flange. Within the space between the intermediate section 47 of the valve housing and the sleeve 39 is a pair of annular valve elements 52 and 53, each of these elements closely embracing the sleeve 39 and being keyed thereto, as indicated at 54. The element 52 rests upon the housing element 45, and by means of springs 55 interposed between the elements 52 and 53, the latter element is forced upwardly into engagement with the under side of the housing element 46. Suitable packing is provided as indicated at 56 to prevent leakage of fluid between the sleeve 39, the housing members 45 and 46 and the valve elements 52 and 53.

It will be apparent from the foregoing description that the sleeve 39 being secured to the base 1 through the medium of the plate 43 remains stationary, as also do the valve elements 52 and 53 which are secured by the keys. The housing 45—46—47, however, is secured to the flange 11, and through the flange 11 with the shaft 8 with which, therefore, the housing rotates. It will be apparent also that the head 24, the die elements supported therein, the pressure cylinders 12 and the housing elements of the master valve 38 rotate with the shaft 8 as a unit.

In the outer faces of each of the valve housing, elements 45 and 46 is a series of ports, 57 and 58 respectively, the ports of each series corresponding in number with the cylinders 12. The ports 57 of the housing element 45 are respectively connected through pipes 59 to the ports 17 of the cylinders 12, and the ports 58 of the housing element 46 are similarly connected through pipes 61 with the cylinder ports 18. Each of the ports 57 extends inwardly of the element 45 in the radial direction and upwardly to the surface contacted by the valve element 52. Each of the ports 58 extends radially inwardly in the housing element 46 and downwardly to the surface of that element contacted by the valve element 53.

It should be apparent from the foregoing that mechanisms have been provided whereby a series of molds and cooperating press plungers are rotated about the vertical axis and arranged to cooperate in succession to form molded plastic articles. Reference may be had to the Lauterbach Patent 2,198,543 for the mechanical details of the molding machine which may not have been herein described.

As previously mentioned, the main object here is to feed in succession measured charges of thermo-plastic moldable material into a moving succession of molds and to form therefrom finished objects. Consequently, there is provided a plasticating and extruding member 70 adapted to bring organic thermo-plastic material to a heated moldable condition and which is thereafter passed under pressure into the accumulating chamber 71 where its working or molding temperature is maintained by electrical heating elements 72.

From this accumulating chamber 71 the material passes into a conduit 73 formed in the head 74 and in which a plunger 75 is also adapted for reciprocating motion.

The plunger 75 is attached to a holder 80 which in turn is attached to the piston 82 of cylinder 83 by means of an adjustable connecting joint 84. The cylinder 83 is mounted upon the stationary support bracket 76 which in turn is attached to the stationary housing 5 of the molding machine. Formed on the top surface of the holder is a flat surface 86 upon which is mounted a block 87. Guide ways 88 are formed upon the block 87 and are adapted to guide a link block 89 therein.

Toggle links 92 and 93 are fulcrumed on the guide block 89 and have pivotal connections 95 and 96 with the stripper arms 97 and 98. The stripper arms are fulcrumed at 100 on a support 101 and have a spring tension clip 102 to prevent motion of the arms other than that provided by the cylinder 83. The support 101 is formed as an integral part of the support bracket 76. Formed on the outer ends of the stripper arms 97 and 98 are a pair of semi-circular members 105 and 106 which are arranged in their closed position to form a slight clearance circle about the outside of plunger 75.

Starting with the parts in the position shown in Figs. 2 and 3 the reciprocating plunger 75 is in its outermost position and the charge or gob of plastic material is shown prior to stripping therefrom. When the plunger 75 first projects from the head 74 the stripper fingers 105 and 106 are in the open position as shown in Fig. 5, but immediately upon the plunger reaching the outer position shown in Fig. 2, these fingers are closed by the contact as between the block 89 and the shoulder 85 formed on the block 87. This contact is made just previous to the end of the forward stroke of the piston 82 and provides sufficient movement of the block 89 to swing the arms 97 and 98 about the fulcrum 100 to bring the split ring portions 105 and 106 to closed position about the plunger 75 and behind the gob "B" as shown in Figs. 2 and 3.

At this time the timing cam 107 on the molding machine through its cam portions 121 actuates a valve 108 thereby supplying fluid pressure to the line 115 of the cylinder 82, thus moving the piston and withdrawing the plunger 75 into the head 74, preparatory to the formation of a next succeeding gob or charge of molding material. With the fingers 105 and 106 in their closed position, the plastic gob "B" is brought into contact with the outer surface area 116 of these stripper members 105 and 106 and is stripped from the plunger 75 and permitted to drop freely into the cavity 34a of the mold 34. As shown in Fig. 6 it will be noted that the charge of material is just extruding from the chamber 73 of head 74 and the plunger 75 is about to issue from the opening. At this point the members 105 and 106 are in open position. In Fig. 7 the plunger 75 has reached its extreme outer position on the ejecting stroke and the stripper fingers 105 and 106 have closed around the plunger 75 and behind the gob of plastic material.

In Fig. 8, the plunger 75 has started on its retraction stroke and has reached a position within the confines of the circle formed by the members 105 and 106 and has thus stripped the gob "B" from the plunger 75.

In Fig. 9, the mandrel 37 is shown in cooperative forming position with mold 34 and the plastic material of gob "B" has been displaced to a position between the mandrel 37 and the walls of the cavity 34a to thereby form a hollow article by the application of pressure.

During the retraction stroke of the plunger 75 the arms 95 and 96 remain in closed position until relative movement occurs between the slide block 87 and the fulcrum block 89 or until such time as the surface 90 comes into contact with the shoulder 91 on block 87 thus moving the block 89 and slide block 87 in unison and swinging the arms 97 and 98 about the fulcrum 100 to bring the stripping members 105 and 106 to open position as shown in Fig. 5.

As the parts reach this retracted position, the end of the plunger 75 has reached the position shown in Fig. 3, thereby opening the chamber 73 and permitting workable material to flow under pressure of the extruder 70 from the chamber 71 through opening 110.

Mounted on the cylinder feeder support 76 is a slide member 145 having a longitudinal channel 146 formed therein in which a pin 147 attached to the block 80 may move during the reciprocation of the piston 82. This pin and groove arrangement 146 and 147 functions to prevent the rotation of the member 80 about the longitudinal center line of the piston 82.

Through the control of the pressure being exerted by the extruding and plasticating mechanism 70, the temperature of the plastic material and the timing of the movements of the ejecting stroke of the plunger 75, the amount of material to be contained in any measured charge of molding material may be controlled. In other words, with a given pressure supplied by the extruder 70, a given material temperature and a given number of strokes per minute of the plunger 75, gobs of a predetermined weight can be discharged in rapid succession to a series of molding elements arranged to pass a loading point in succession.

Referring to Figs. 1, 3 and 10, there is disclosed the gob feeder control mechanism consisting of a cam 107 mounted upon a flange 11 of the molding machine. Clamp bolts 120 are provided periodically around the circumference of the flange 11 and are adapted to hold the cam 107 in any preferable position. It will be noted that this cam 107 is so designed that it may be moved circumferentially around the periphery of the flange 11 to thereby position the valve actuating portions 121 of the cam 107 in any desired operating position. That is, the cam projections 121 may be arranged to precede the mold which is to be filled or in any other desired position with respect to any said mold.

Referring to Fig. 1, a valve 108 is mounted upon the vertical tie rod 4 and the vertical position of the valve block 130 may be adjusted through means of the screw 131. A lever 135 fulcrumed at 136 on the valve block 130 supports a cam roll 137 adapted to contact the actuating surface of the cam 107 and in particular the cam portions 121 thereof.

As a moving cam portion 121 contacts the roll 137 the arm 135 will be lifted and permit the piston 138 of valve 108 to be moved upwardly by a spring 139 to change the position of the valve and permit fluid under pressure to pass through line 140 to the rear end of the cylinder 83.

The application of pressure to the rear end of the cylinder 83 causes the plunger 75 to move outwardly and cause a gob of plastic material in heated moldable condition to issue from the nozzle 74. Through such movement of the plunger 75 a measured charge is segregated from the parent body of moldable material in conduit 71 and to be freely dropped into the mold 34 of the forming machine.

The succession of cam portions 121 obviously cause the gob feeder to work in succession and in cooperation with each individual mold on the molding machine. In this particular instance the molding machine is a continuously rotating machine and consequently the timing as between the gob feeder actions and the molds 34 on the mold table must be such that a gob will drop directly into the cavity 34a of each mold.

Therefore, the cam 107 with its actuating portions 121 may be adjusted circumferentially of the flange 11 to obtain any desired timing arrangement as between the discharge of a gob of moldable material and the presentation of the cavity of the mold for which it is intended. Although the cam 107 is shown as a single member, it is within the purview of this invention that the cam sections 121 may be individual sections and individually adjustable along the circumference of member 107 and about the periphery of the flange 11.

In general, the operation of this mechanism is as follows.

Plastic material in granular or other form is fed to the plasticating and extruding device 70 where it is subjected to pressure and temperature to bring it into a homogeneous heated moldable mass.

As the material reaches its molding condition, it is passed through the extrusion nozzle 71 under pressure and thence through the opening 110 into a chamber 73 in the extrusion head.

At this time the plunger 75 is in its withdrawn position as indicated in Fig. 3 and with the passage of a given time interval sufficient material has entered from orifice 110 into chamber 73 and the plunger 75 starts on its forward movement actuated by the cylinder 83, controlled by the valve 108 and cam portions 121 on the molding machine table 11. The amount of the material fed into chamber 73 is of course controlled by the temperature of the material, the degree of pressure supplied by the extruder mechanism 70 and the time interval provided between the reciprocating motions of the plunger 75.

As the chamber 73 becomes filled with heated moldable material the plunger 75 moves forward closing off the orifice 110 to segregate a measured charge thereof from the parent body of molding material and then passes the material charge outwardly from the chamber 73 to a position over a mold cavity 34a.

As the plunger reaches its outermost position stripper fingers 105 and 106 close about the plunger 75 behind the charge "B" as shown in Figs. 4, 7 and 8. Thus, as the plunger starts on its retraction stroke, the gob of material "B" is contacted by the surface 116 of the stripper fingers 105 and 106 and is stripped from the end of the feeder implement or plunger 75 and permitted to drop freely into a mold cavity therebeneath.

The timing as between the reciprocations of the plunger 75 and the approach of any mold cavity to the charging position can be adjusted through adjustment of cams 121 so that as the gob drops it will be positioned centrally of the moving cavity 34a.

As the mold cavities pass beyond the charging position, cylinders 12 are actuated through the timing valve 38 raising the mold up into cooperative pressing position with the mandrel 37 to thus press a hollow article, as illustrated in Fig. 9. As the molds continue their rotation and the plastic material becomes stabilized or set, a point is reached in the rotation of the machine where the mold is moved downwardly from its pressing contact with the mandrel 37. At this point any well known mechanism may be utilized to remove the molded article from either the mandrel 37 or the mold 34.

Inasmuch as the machine is a continuously rotating machine the molds 34 are presented into continuous succession to the charging station and gobs "B" of the plastic material are likewise deposited in succession in each successive mold cavity.

Modifications may be resorted to within the spirit and scope of my invention.

I claim:

1. The process of separating heated moldable organic plastic material into mold charges which consists of supplying a source of such material under pressure, intermittently discharging severed measured quantities of such material through an outlet, suspending the said discharged material in successive masses beyond said outlet, and freely disposing each separate mass into the cavity of a mold.

2. Apparatus for separating heated moldable plastic material into mold charges, including a container for the moldable material having an outlet, a feeder implement projecting into the material towards the outlet and mounted for movement into and out of the outlet, said implement adapted for shearing contact with said outlet, means for periodically moving said implement toward and from the outlet to periodically shear and discharge charges of material therethrough, means for adjusting the end position of the implement with respect to the outlet, and means positioned externally of said outlet to separate the charge from the feeder implement.

3. Apparatus for separating heated moldable plastic material into mold charges, including a container for the moldable material having an outlet, a feeder implement projecting into the material towards the outlet and mounted for movement into and out of the outlet, said implement adapted for shearing contact with said outlet, means for periodically moving said implement toward and from the outlet to periodically shear and discharge charges of material therethrough, means for adjusting the end position of the implement with respect to the outer edge portions of said outlet, means externally of said outlet adapted to drop the charge into a mold, a molding means operable to shape said charges to final form and a timing means arranged to actuate said relation.

4. The method in accordance with claim 1 including continuously presenting successive mold cavities in timed relation to each successive charge suspension.

References Cited in the file of this patent

UNITED STATES PATENTS

| | | | |
|---|---|---|---|
| 1,118,204 | Hulbert | Nov. 24, | 1914 |
| 1,362,785 | Ferngren | Dec. 21, | 1920 |
| 1,977,515 | Klipple | Oct. 16, | 1934 |
| 2,128,249 | Honiss | Aug. 30, | 1938 |
| 2,175,054 | Ferngren et al. | Oct. 3, | 1939 |
| 2,227,728 | Lombi | Jan. 7, | 1941 |
| 2,278,513 | Emerson | Apr. 7, | 1942 |
| 2,329,288 | Miller | Sept. 14, | 1943 |
| 2,375,955 | Smith | May 15, | 1945 |
| 2,404,462 | Sullivan | Jan. 18, | 1946 |
| 2,494,112 | Wahl | Jan. 10, | 1950 |
| 2,505,540 | Goldhard | Apr. 25, | 1950 |
| 2,674,006 | Bailey et al. | Apr. 6, | 1954 |
| 2,705,342 | Hendry | Apr. 5, | 1955 |
| 2,712,693 | Comparette | July 12, | 1955 |
| 2,754,545 | Hendry | July 17, | 1956 |
| 2,774,104 | Miller | Dec. 18, | 1956 |